United States Patent [19]

Kraus

[11] 4,422,351

[45] Dec. 27, 1983

[54] TRACTION ROLLER TRANSMISSION

[75] Inventor: Charles E. Kraus, Austin, Tex.

[73] Assignee: Excelermatic Inc., Austin, Tex.

[21] Appl. No.: 281,983

[22] Filed: Jul. 10, 1981

[51] Int. Cl.³ .................. F16H 13/06; F16H 13/00
[52] U.S. Cl. .................................. 74/798; 74/208; 74/209; 74/206
[58] Field of Search ............... 74/798, 772, 209, 208, 74/206; 267/161, 162, 164

[56] References Cited

U.S. PATENT DOCUMENTS

| | | | |
|---|---|---|---|
| 771,541 | 10/1904 | Ericson | 74/208 |
| 1,212,462 | 1/1917 | Donnelly | 74/209 |
| 1,704,205 | 3/1929 | Oakes et al. | 74/208 |
| 1,956,934 | 5/1934 | Stelzer | 74/208 |
| 3,610,060 | 5/1970 | Howko | 74/208 |
| 4,215,595 | 8/1980 | Kraus | 74/798 |

FOREIGN PATENT DOCUMENTS

| | | | |
|---|---|---|---|
| 427104 | 4/1924 | Fed. Rep. of Germany | 267/162 |
| 1145862 | 3/1963 | Fed. Rep. of Germany | 267/161 |
| 281542 | 3/1952 | Switzerland . | |

OTHER PUBLICATIONS

"Mechanical Design and Systems" Handbook, pp. 14-8, 14-9; McGraw Hill, New York, 1964, Harold A. Rothbant.

Primary Examiner—Lawrence J. Staab
Assistant Examiner—D. Wright
Attorney, Agent, or Firm—Klaus J. Bach

[57] ABSTRACT

A traction roller transmission having a number of traction rollers disposed in an annular space formed between a sun roller structure rotatable with one shaft and a traction ring structure surrounding the sun roller. The traction rollers are rotatably supported and the traction rollers or the traction ring structures are mounted for movement with another shaft. The traction rings or sun roller structures have Belleville-type rings disposed between cam structures such that a torque transmitted through the transmission forces the traction rings toward each other for firm engagement of the traction rollers with the traction ring and the sun roller structures. At least the radial surfaces of the Belleville rings which are in contact with the traction rollers are rounded.

7 Claims, 6 Drawing Figures

TRACTION ROLLER TRANSMISSION

BACKGROUND OF THE INVENTION

1. Field of the Invention

The invention relates to fixed ratio traction roller transmissions in which the contact forces applied to the traction surfaces which are in engagement with each other for the transmission of movement are dependent on the torque transmitted through the transmission.

2. Description of the Prior Art

Traction roller transmissions in which large contact forces are applied to prevent slippage of the rollers are described for example by Harold A. Rothbart in "Mechanical Design And Systems" Handbook, pages 14–8 and 14–9, McGraw-Hill, New York, 1964. In the relatively simple arrangements of FIGS. 14.6 and 14.7 wherein the outer rings are slightly undersized to compress the roller arrangements, the surface pressure on the traction surfaces is always the same; that is, it is always high independently of the torque transmitted through the transmission. Various transmission arrangements are also known in which the contact pressure of the traction surfaces is dependent on the size of the torque transmitted through the transmission, for example, as in those shown on page 14–8 of said handbook. Other transmissions of this type are shown in U.S. Pat. Nos. 771,541; 1,212,462; 1,704,205; 1,956,934; and 3,610,060. A transmission which includes Belleville-type springs on the sun roller or the traction ring surrounding the planetary rollers is disclosed in the present inventor's earlier U.S. Pat. No. 4,215,595.

SUMMARY OF THE INVENTION

In a traction roller transmission having coaxial input and output shafts, a sun roller structure is supported by one of the shafts and traction rollers are disposed around the sun roller, while a traction ring structure surrounds, and is in contact with, the traction rollers. At least one of the traction ring and sun roller structures includes a plurality of Belleville-type spring rings arranged between means for forcing the spring rings toward each other so as to cause their engagement with the traction rollers and engagement of the traction rollers with the sun roller and the traction ring structures. The radial spring ring surfaces in engagement with the traction rollers are rounded to reduce wear of the roller surfaces.

The Belleville-type spring rings are normally slightly conical in shape and, when compressed, their radially outer areas are stressed and their inner areas compressed so that their inner diameter is decreased while their outer diameters are increased.

DESCRIPTION OF THE PREFERRED EMBODIMENT

Figure 1:
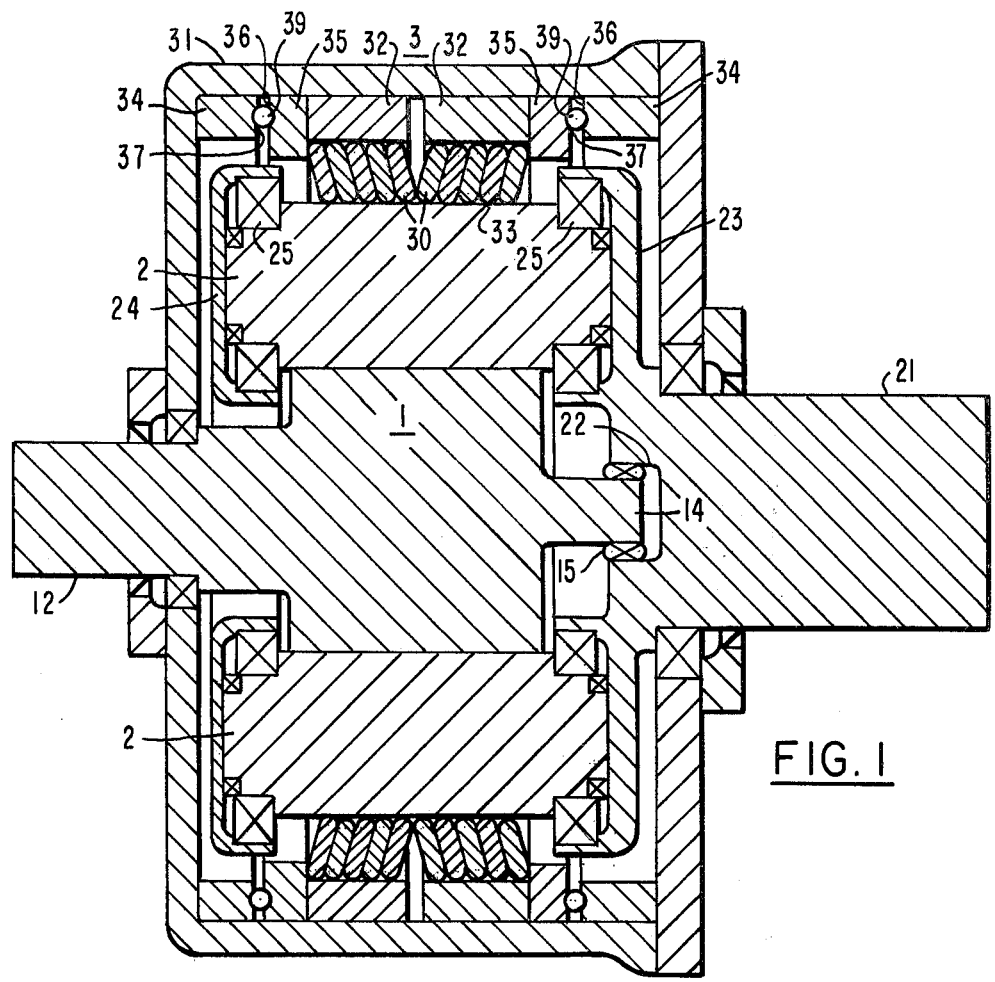
FIG. 1 is a cross-sectional view of a traction roller transmission.

FIG. 1 shows a traction roller transmission including basically a sun roller 1 centrally disposed witnhin a traction ring assembly 3 and traction rollers 2 arranged in the annular path between the sun roller 1 and the traction ring assembly 3.

The sun roller 1 is part of, or mounted on, an input shaft 12 for rotation therewith. The input shaft 12 has a trunnion 14 extending into a bore 22 in an output shaft 21 and is supported thereby by a bearing 15. The output shaft 21 has a flange 23 which, together with an opposite ring structure 24, carries the traction rollers 2 on roller bearings 25. The ring structure 24 may be connected to the flange 23 by studs (not shown) for greater stability.

The traction rollers 2 are cylindrical and are in frictitonal engagement with the central sun roller 1.

The traction ring assembly 3 consists of a housing ring 31 enclosing two support ring structures 32 which house Belleville-type rings 30 with inner traction surfaces 33 in engagement with the traction rollers 2. Cam rings 34 are mounted at the axially opposite ends of the housing ring 31 adjacent inner cam structures 35 between which the Belleville-type rings 30 are engaged. The opposite surfaces of the outer cam rings 34 and the inner cam rings 35 are provided with cam surfaces 36 and 37 and rollers or balls 39 are held in the space between the cam surfaces so that relative rotational movement between the cam rings 35 and the housing ring 31 with its cam rings 34 forces the cam rings 35 and spring ring housings 32, together with the spring discs 30, toward each other and axially compresses the Belleville spring rings 30 which forces their inner surfaces 33 into firm engagement with the traction rollers 2.

For detailed design features of the basic transmission reference is made at this point to this applicant's U.S. Pat. No. 4,215,595.

As shown in this patent, the Belleville-type spring rings may just as well be associated with the sun roller.

The Belleville-type rings are normally flat with sharp edges which generate a high load on the traction roller and traction ring surfaces. In addition, the rings must be conical to a substantial degree in order to provide for radial growth when they are flattened.

Figure 2:
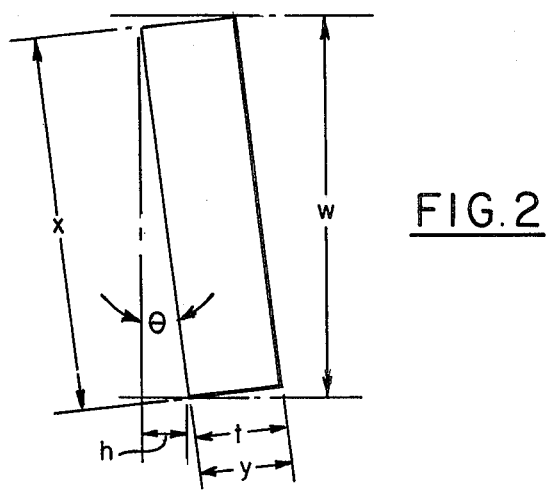
FIG. 2 is a partal cross-sectional view of a normal Belleville-type spring ring.

FIG. 2 shows a portion of a normal Belleville spring in cross-section. Its width w is one-half of the difference between its outer and inner diameters. Its thickness is t and h is its deflection height or the amount and $\theta$ the angle of axial deflection required to press the spring ring flat. x is the distance between adjacent inner and outer roll centers and y represents the axial distance between the roll centers (circles) of the Belleville spring. The change in width w upon axial deflection of the spring ring is $\Delta$.

It may be seen that, in order to provide a positive $\Delta$, that is an increase of w, upon deflection of the Belleville ring, h must be larger than y. The maximum achievable $\Delta$ of such an arrangement is:

$$\Delta \text{Max} = x(1 - \cos \theta) - y \sin \theta.$$

Figure 3:
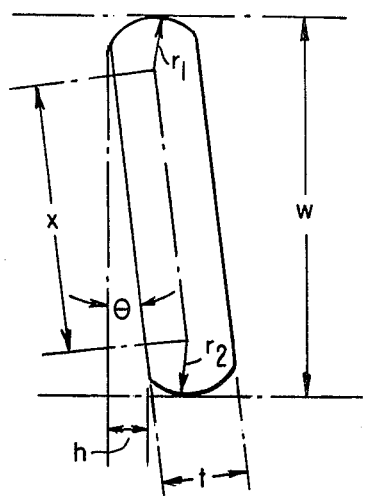
FIGS. 3 to 6 show, in section, embodiments of the Belleville spring rings illustrating different shapes thereof, with radial inner and outer edges curved in various manners.

FIG. 3 shows an improved Belleville spring wherein, in accordance with the present invention, the radially inner and outer ends of the Belleville spring ring are rounded having radii of curvature of $r_1$ and $r_2$ respectively (y=0). Contact of the Belleville springs with the housing ring or the planetary rollers takes place along the rounded area. In the arrangement as shown in FIG. 3, $\Delta$ is at its maximum value when $\theta$ is zero, that is when the spring is pressed flat:

$$\Delta \text{Max} = x(1 - \cos \theta)$$

Note however that x and, consequently $\Delta$, is dependent on $\tau_1$ and $\tau_2$ since x decreases as $\tau_1$ and $\tau_2$ increase. For $\tau_1 = \tau_2$ and $x = 0$, $\Delta$ becomes zero. $\Delta$, however, should be large for a given axial movement and $\tau_1$ and $\tau_2$ should be relatively large in order to provide for relatively small surface pressures and relatively long life of the transmission.

Figure 4:
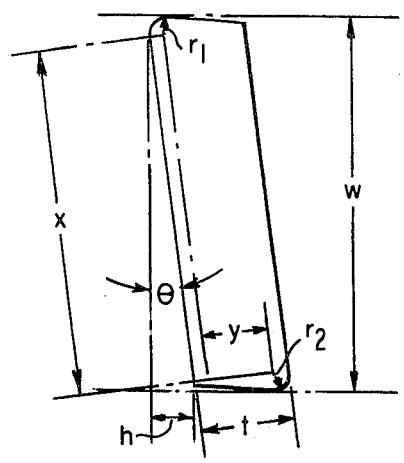

FIG. 4 shows an arrangement which provides for a relatively large $\Delta$ as the radial inner and outer surfaces of the Belleville springs are cut slightly conically in such a manner that the axially most distant edges of the spring ring contact the inner roller and the outer ring surfaces. The contacting edges are slightly rounded with radii $\tau_1$ and $\tau_2$ for reduced surface pressure. The maximum achievable radial growth of this arrangement is $$\Delta \text{Max} = x(1 - \cos \theta) + y \sin \theta$$

which is much larger than $x(1 - \cos \theta)$ achievable for the arrangement of FIG. 3.

Figure 5:
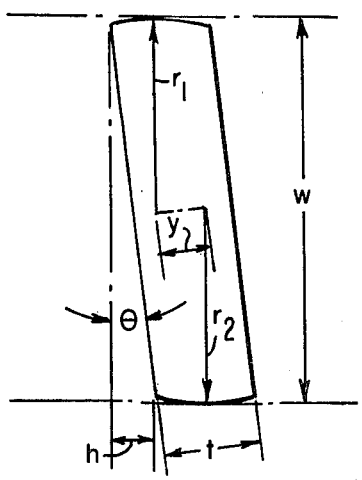

In the arrangement of FIG. 5, $\tau_1 = \tau_2$ and x equals zero. However, the roll centers are axially spaced from each other by y so that the maximum radial growth is:

$$\Delta \text{Max} = y \sin \theta.$$

With this arrangement the radius of the curvature at both contact surfaces is about as large as possible and, consequently the load capacity of the traction surfaces is high.

As shown in FIG. 5, $\tau_1 = \tau_2$, but other combinations are possible. $\tau_1$ at the transmission housing ring for example may be very small and the area of radius $\tau_2$ in contact with the rollers may be relatively large. With $\tau_1$ very small, $\tau_2$ may be close to w providing for very large load capacity of the contact surfaces at the traction rollers.

Figure 6:
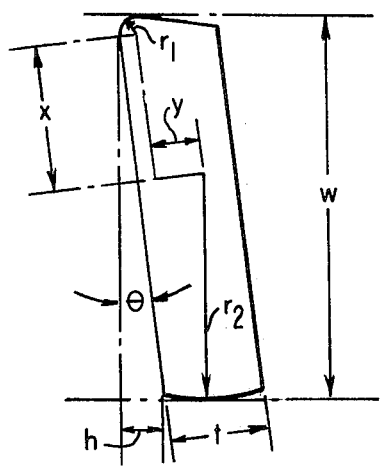

If, as shown in FIG. 6, $\tau_1$ is very small and $\tau_2$ is large but smaller than $w - \tau_1$, then x appears again and maximum radial growth is:

$$\Delta \text{Max} = x(1 - \cos \theta) + y \sin \theta$$

For long transmission life, the radius of the rolling contact surface should be as large as possible, but the maximum value of $\tau_2$ is also dependent on the proportions of a Belleville spring ring such as h, t, and w since, when the ring is pressed flat the contact area of the ring should not be too close to the edge of the ring. As mentioned, $\tau_1$ does not need to be as large as $\tau_2$ if it is the area with the radius $\tau_2$ which provides for the rolling contact with the planetary rollers.

I claim:

1. A traction roller transmission comprising a traction ring structure having inner traction surfaces, a sun roller centrally disposed within the traction ring structure and having a circumferential traction surface spaced from the traction surface of said traction ring structure, planetary traction rollers supported in the space between the sun roller and the traction ring structure, and engagement means for forcing said traction rollers into frictional engagement with said traction ring structure and said sun roller; wherein at least one of said traction surfaces is formed by a stack of Belleville-type spring rings, and means are provided for axially compressing said Belleville-type spring rings when a torque is transmitted through said transmission so as to cause radial expansion of the spring rings for firm frictional engagement of said spring rings with the adjacent traction rollers, said spring rings having adjacent said planetary traction rollers radial end surfaces curved in the axial direction of the sun roller and providing rolling contact with said planetary traction rollers.

2. A traction roller transmission as claimed in claim 1, wherein, with one of their radially inner and outer surfaces, each of said Belleville spring rings is in contact with a support surface while the other is in rolling contact with traction rollers and at least said one of the radially inner and outer surfaces of each Belleville spring ring is formed slightly conically in such a manner that the radially most projecting edges in the axially most protruding areas of the spring rings are in contact with the adjacent roller and said support surfaces, and wherein at least the edges in contact with said roller surfaces are rounded to reduce wear.

3. A traction roller transmission as claimed in claim 1, wherein said Belleville spring rings have radially inner and outer surfaces which are axially curved, said curved radially inner and outer surfaces having centers of curvature which are axially spaced from each other.

4. A traction roller transmission as claimed in claim 3, wherein the axial spacing of said centers of curvature is less than the thickness of said Belleville spring rings and said centers are located within said spring rings.

5. A traction roller transmission as claimed in claim 4, wherein the radial location of said centers of curvature within said Belleville spring rings is about in the middle between the spring rings radially inner and outer surfaces.

6. A traction roller transmission as claimed in claim 2, wherein the radial inner and outer contact surfaces of said Belleville spring rings are curved and one of said inner and outer curved contact surfaces of each spring ring has a center-of-curvature circle which is spaced from said curved contact surface by a substantially greater amount than the center-of-curvature circle of the other of the radial contact surface is spaced from the other contact surface defining it.

7. A traction roller transmission as claimed in claim 6, wherein the curvature of said curved spring ring contact surfaces in contact with said traction rollers is sufficiently large so as to provide for radial spacing of the respective center-of-curvature circles of said curved contact surfaces from said traction rollers of at least one half the radial width of said Belleville spring rings.

* * * * *